(12) United States Patent
Joye

(10) Patent No.: US 8,218,760 B2
(45) Date of Patent: Jul. 10, 2012

(54) METHOD AND A DEVICE FOR GENERATING COMPRESSED RSA MODULI

(75) Inventor: Marc Joye, Cesson-Sevigne (FR)

(73) Assignee: Thomson Licensing, Boulogne, Billancourt (FR)

( * ) Notice: Subject to any disclaimer, the term of this patent is extended or adjusted under 35 U.S.C. 154(b) by 360 days.

(21) Appl. No.: 12/449,654

(22) PCT Filed: Feb. 19, 2008

(86) PCT No.: PCT/EP2008/052017
§ 371 (c)(1),
(2), (4) Date: Aug. 19, 2009

(87) PCT Pub. No.: WO2008/104482
PCT Pub. Date: Sep. 4, 2008

(65) Prior Publication Data
US 2010/0091983 A1    Apr. 15, 2010

(30) Foreign Application Priority Data
Feb. 27, 2007    (EP) .................................... 07300830

(51) Int. Cl.
*H04L 29/06*    (2006.01)
(52) U.S. Cl. ................ 380/30; 380/44; 380/45; 380/46; 380/47; 380/28; 708/250; 708/251; 708/252; 708/253; 708/254; 708/255; 708/256
(58) Field of Classification Search .............. 380/44–30; 708/250–256
See application file for complete search history.

(56) References Cited

U.S. PATENT DOCUMENTS

| | | | | |
|---|---|---|---|---|
| 6,134,325 | A * | 10/2000 | Vanstone et al. | 380/30 |
| 6,928,163 | B1 * | 8/2005 | Matyas et al. | 380/30 |
| 2002/0154768 | A1 | 10/2002 | Lenstra | |
| 2003/0021410 | A1 * | 1/2003 | Miyazaki et al. | 380/30 |
| 2004/0049526 | A1 * | 3/2004 | Joye et al. | 708/250 |
| 2004/0114757 | A1 * | 6/2004 | Joye et al. | 380/44 |
| 2004/0264702 | A1 * | 12/2004 | Eastlake, III | 380/277 |

OTHER PUBLICATIONS

What is Lossless Compression? Publisher: wiseGeek; Date: Dec. 25, 2004.*
Encryption by SearchSecurity.com; Date: Jul. 31, 2000.*
Short RSA Keys and Their Generation by Vanstone et al; Publisher: International Association for Cryptologic Research; Date: Jan. 4, 1994.*
A.K. Lenstra: "Generating RSA moduli with a predetermined portion" Lecture Notes in Computer Science, Springer Erlag, Berlin, DE, No. 1514, Oct. 1, 1998, pp. 1-10 XP002108059.
Marc Joye et al: "Fast Generation of Prime Numbers on Portable Devices: An Update" Cryptographic Hardware and Embedded Systems-CHES 2008, Lecture Notes in Computer Science , Springer, Berlin, DE, vol. 4249, Jan. 1, 2006, pp. 160-173, XP019046817.
Search Report Dated Sep. 30, 2008.

* cited by examiner

*Primary Examiner* — Taghi Arani
*Assistant Examiner* — Madhuri Herzog
(74) *Attorney, Agent, or Firm* — Jeffrey D. Carter

(57) ABSTRACT

Method and device for generating factors of a RSA modulus N with a predetermined portion $N_h$, the RSA modulus comprising at least two factors. A first prime p is generated; a value $N_h$ that forms a part of modulus N is obtained; a second prime q is generated in an interval dependent from p and $N_h$ so that pq is a RSA modulus that shares $N_h$; and information enabling the calculation of the modulus/V is outputted.

7 Claims, 1 Drawing Sheet

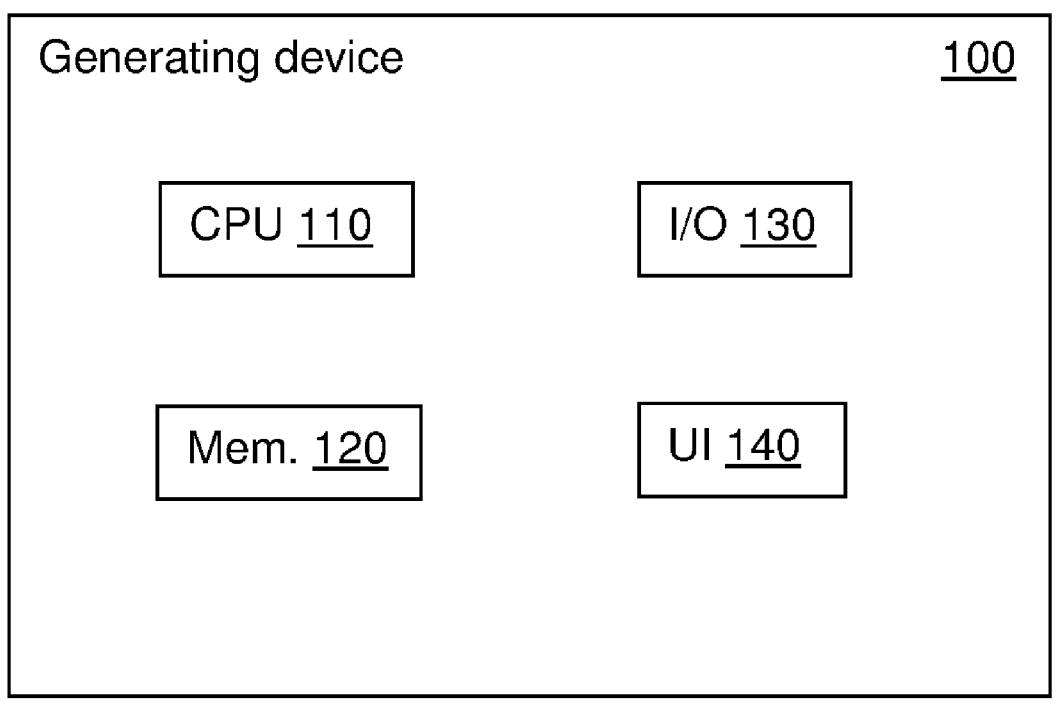

METHOD AND A DEVICE FOR GENERATING COMPRESSED RSA MODULI

This application claims the benefit, under 35 U.S.C. §365 of International Application PCT/EP2008/052017, filed Feb. 19, 2008, which was published in accordance with PCT Article 21(2) on Sep. 4, 2008 in English and which claims the benefit of European patent application No. 07300830.2, filed on Feb. 27, 2007.

FIELD OF THE INVENTION

The present invention relates generally to public-key encryption algorithms, and in particular to compressed representations of Rivest-Shamir-Adleman (RSA) moduli.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Let $N=pq$ be the product of two large primes. We let e and d denote a pair of public and private exponents, satisfying $ed \equiv 1 (\bmod \lambda(N))$, with $\gcd(e, \lambda(N))=1$ and $\lambda$ being Carmichael's function. As $N=pq$, we have $\lambda(N)=\text{lcm}(p-1, q-1)$. Given $x<N$, the public operation (e.g., message encryption or signature verification) consists in raising x to the e-th power modulo N, i.e., in computing $y=X^e \bmod N$. Then, given y, the corresponding private operation (e.g., decryption of a ciphertext or signature generation) consists in computing $y^d \bmod N$. From the definition of e and d, we obviously have that $y^d \equiv x (\bmod N)$. The private operation can be carried out at higher speed through Chinese remaindering (CRT mode). Computations are independently performed modulo p and q and then recombined. In this case, private parameters are $\{p, q, d_p, d_q, i_q\}$ with $d_p=d \bmod(p-1)$, $d_q=d \bmod(q-1)$, and $i_q=q^{-1} \bmod p$. We then obtain $y^d \bmod N$ as $\text{CRT}(x_p, x_q)=x_q+q[i_q(x_p-x_q) \bmod p]$, where $x_p=y^{d_p} \bmod p$ and $x_q=y^{d_q} \bmod q$.

To sum up, a (two-factor) RSA modulus $N=pq$ is the product of two large prime numbers p and q, satisfying $\gcd(\lambda(N), e)=1$. If n denotes the bit-size of N then, for some $1<n_0<n$, p must lie in the range $[2^{n-n_0-1/2}, 2^{n-n_0}-1]$ and q in the range $[2^{n_0-1/2}, 2^{n_0}-1]$ so that $2^{n-1}<N=pq<2^n$. For security reasons, so-called balanced moduli are generally preferred, which means $n=2n_0$.

Typical RSA moduli range from 1024 to 4096 bits. It is now customary for applications to require moduli of at least 2048 bits. However, the programs and/or devices running the RSA-enabled applications may be designed to support only 1024-bit moduli. The idea is to compress the moduli so that they can fit in shorter buffers or bandwidths: rather than storing/sending the whole RSA moduli, a lossless compressed representation is used. This also solves compatibility problems between different releases of programs and/or devices. Of independent interest, such techniques can be used for improved efficiency: savings in memory and/or bandwidth.

Arjen K. Lenstra (Generating RSA moduli with a predetermined portion. *Advances in Cryptology—ASIACRYPT '98* volume 1514 of *Lecture Notes in Computer Science*, pages 1-10. Springer, 1998) proposes generation method, but Lenstra's method is not suited to constrained devices like smart cards because second prime q is constructed incrementally, which may result in prohibitely too long running times.

The present invention overcomes problems of the prior art in that it the compressed RSA moduli are carried out through the generation of two primes in a prescribed interval. As a result, they can benefit from efficient prime generation algorithms such as the one proposed by Marc Joye, Pascal Paillier, and Serge Vaudenay (Efficient generation of prime numbers. *Cryptographic Hardware and Embedded Systems—CHES 2000*, volume 1965 of *Lecture Notes in Computer Science*, pages 340-354. Springer, 2000) and improved by Marc Joye and Pascal Paillier (Fast generation of prime numbers on portable devices: An update. *Cryptographic Hardware and Embedded Systems—CHES 2006*, volume 4249 of *Lecture Notes in Computer Science*, pages 160-173, Springer, 2006). In particular, they are very well suited in situations where the goal is to generate a 2048-bit RSA modulus N (i.e., n=2048) with fixed public exponent $e=2^{16}+1$ so that (much) less than 2048 bits are needed to store N or a representation of N.

SUMMARY OF THE INVENTION

In a first aspect, the invention is directed to a method of generating factors of a RSA modulus N with a predetermined portion $N_h$. The RSA modulus comprises at least two factors. First, a first prime p is generated, obtaining a value $N_h$ that forms a part of modulus N is obtained, a second prime q is generated, and at least a lossless compressed representation of the modulus N is output, the lossless compressed representation enabling unambiguous recovery of the modulus N. The second prime q is generated in an interval dependent from p and $N_h$ so that pq is a RSA modulus that shares $N_h$.

In a first preferred embodiment, the predetermined portion $N_h$ heads the RSA modulus. It is advantageous that the RSA modulus is a n-bit modulus and the predetermined portion $N_h$ comprises $\kappa$ bits and the first prime p is generated in the interval $p \in [2^{n-n_0-1/2}, 2^{n-n_0}-1]$ so that $\gcd(p-1,e)=1$; the second prime q is generated in the interval $$q \in \left[\frac{2^{n-\kappa}N_h + 1}{p}, \frac{2^{n-\kappa}(N_h+1)-1}{p}\right]$$

so that such that $\gcd(q-1,e)=1$; and $N=N_h \| N_l$, where $N_l=(pq) \bmod 2^{n-\kappa}$.

In a second preferred embodiment, the predetermined portion $N_h$ trails the RSA modulus. It is advantageous that the first prime p is generated in the interval $p \in [2^{n-n_0-1/2}, 2^{n-n_0}-1]$ so that $\gcd(p-1,e)=1$; the second prime q is generated by calculating $q=C+q'2^\kappa$, where $$C = \frac{N_h}{p} \bmod 2^\kappa$$

and q' is generated in the interval $$q' \in \left[\frac{2^{n-1}+1-Cp}{2^\kappa p}, \frac{2^n-Cp}{2^\kappa p}\right]$$

so that gcd(q−1,e)=1, $$N_l = \left\lfloor \frac{pq}{2^\kappa} \right\rfloor$$

is defined, and $\tilde{N}=\{N_l, s_0[\kappa,n]\}$ is output.

In a third preferred embodiment, $N_h$ is obtained by the encryption of at least a part of the first prime p.

In a second aspect, the invention is directed to a device for generating factors of a RSA modulus N with a predetermined portion $N_h$, the RSA modulus comprising at least two factors. The device comprises a processor for generating a first prime p; obtaining a value $N_h$ that forms a part of modulus N; and generating a second prime q in an interval dependant from p and $N_h$ so that pq is a RSA modulus that shares $N_h$. The device further comprises an interface for outputting at least a lossless compressed representation of the modulus N that enables unambiguous recovery of the modulus N.

In a first preferred embodiment, the device is a smartcard.

"Sharing" is to be interpreted as having the same value for the part that is shared, e.g. hexadecimal 1234567890abcdef and 123456789abcdef0 share 123456789 in the leading part of the numbers.

BRIEF DESCRIPTION OF THE DRAWINGS

The various features and advantages of the present invention and its preferred embodiments will now be described with reference to the accompanying drawings which are intended to illustrate and not to limit the scope of the present invention and in which FIG. 1 illustrates a device for RSA moduli generation according to a preferred embodiment of the invention.

DETAILED DESCRIPTION OF PREFERRED EMBODIMENTS

General Idea

The general inventive idea consists in fixing a large part of an RSA modulus N (e.g., up to its top half in the preferred embodiment) so that the primes forming N can be drawn arbitrarily from an interval (and not tried incrementally as was suggested in previous proposals). The large part of the RSA modulus is either evaluated from a random short seed using a (public) pseudo-random number generator or shared amongst users.

This results in faster (and much easier to implement) compression techniques for RSA moduli. Furthermore, the so-produced RSA moduli are indistinguishable from regular RSA moduli (i.e., there is no difference in the output distribution). Finally, they are compatible with state-of-the-art prime generation techniques (in which case there is no extra cost).

Preferred Embodiment

Let $1<\kappa \leq n_0$. An n-bit RSA modulus N, being a product of two large primes p and q, can be generated as follows.

1. Using a pseudo-random number generator, produce a κ-bit integer $N_h$ from a random seed $s_0$:

$$N_h = (2^{\kappa-1} \vee PRNG(s_O)) \in [2^{\kappa-1}, 2^\kappa - 1]$$

Note that OR-ing with $2^{\kappa-1}$ ensures that the most significant bit of $N_h$ is 1. The skilled person will appreciate that it is naturally also possible to choose the value of $N_h$.

2. Generate a random prime $p \in [2^{n-n_0-1/2}, 2^{n-n_0}-1]$ such that gcd(p−1,e)=1.

3. Generate a random prime q:

$$q \in \left[ \frac{2^{n-\kappa}N_h + 1}{p}, \frac{2^{n-\kappa}(N_h+1)-1}{p} \right]$$

such that gcd(q−1,e)=1. If no such prime is found, the process is reiterated.

4. Define $N_l = (pq) \bmod 2^{n-\kappa}$ and output $\tilde{N}=\{N_l, s_0, [\kappa, n]\}$.

Given the representation $\tilde{N}$, it is now easy to publicly recover the corresponding n-bit RSA modulus N, namely $N=N_h\|N_l$ where $N_h$ is the κ-bit integer obtained as $N_h=2^{\kappa-1} \vee PRNG(s_0)$.

It should be noted that if $2^{n-\kappa} \leq p$ then the range q is chosen from may be empty. This explains why κ should be at most $n_0$. Therefore, the previous method compresses at best n-bit RSA moduli up to $n_0$ bits. The worst case is for balanced RSA moduli (i.e., $n=2n_0$), yielding (at best) a compression ratio of 1÷2.

First Alternative Embodiment

In an alternative embodiment, the trailing bits of modulus N are fixed.

1. Produce $N_h=(1 \vee PRNG(s_0)) \in [1, 2^\kappa - 1]$ from the seed $s_0$. $N_h$ may naturally also be chosen.
2. Generate a first prime $p \in [2^{n-n_0-1/2}, 2^{n-n_0}-1]$ and gcd(p−1,e)=1.
3. Let $$C = \frac{N_h}{p} \bmod 2^\kappa$$

generate a second prime q
q=C+q'$2^\kappa$ with $$q' \in \left[ \frac{2^{n-1}+1-Cp}{2^\kappa p}, \frac{2^n - Cp}{2^\kappa p} \right]$$

and gcd(q−1,e)=1, if any.

4. Define $$N_l = \left\lfloor \frac{pq}{2^\kappa} \right\rfloor$$

and output $\tilde{N}=\{N_l, s_0, [\kappa,n]\}$.

It will be appreciated that it is not necessary to include the most significant bit of $N_l$ in $\tilde{N}$, as it is sure to be a 1.

More generally, it is also possible to fix some leading bits and some trailing bits of N.

Second Alternative Embodiment

The proposed methods can be adapted to accommodate RSA moduli that are made of more than 2 factors, for example, 3-prime RSA moduli or RSA moduli of the form $N=p^rq$. For a further description of this, one may advantageously turn to Tsuyoshi Takagi's paper (Fast RSA-type cryptosystem modulo $p^kq$. *Advances in Cryptology—CRYPTO '98*, volume 1462 of *Lecture Notes in Computer Science*, pages 318-326. Springer, 1998).

Third Alternative Embodiment

The proposed methods also apply when the common part of RSA modulus N, say $N_h$, is shared amongst users or is common to all users for a given application. In such a case, there is no need to transmit random seed $s_0$ (as well as the values of κ and n).

Device

FIG. 1 illustrates a device for RSA moduli generation according to a preferred embodiment of the invention. The generating device 100 comprises at least one processor 110, at least one memory 120, communication means 130 that may comprise separate input and output units, and possibly a user interface 140. The processing means is adapted to perform the method of any of the methods described hereinbefore.

Key Escrow

It will be appreciated that the present invention may advantageously be used for key escrow purposes. In the case of a RSA modulus N=pq, knowledge of about half of the bits of p (or q) suffices to recover the private key using for example lattice reduction techniques. Therefore, if about half (or more) of the bits of p are encrypted using a secret key K and embedded in the representation of public RSA modulus N, then an 'authority' that knows K will be able to reconstruct p from N and thus compute the corresponding private RSA key. The encrypted bits of p may be comprised in the predetermined part of the RSA modulus.

It will further be appreciated that the method according to the invention is particularly advantageous for use in smartcards and other resource constrained devices, as the method uses relatively little resources.

Each feature disclosed in the description and (where appropriate) the claims and drawings may be provided independently or in any appropriate combination. Features may, where appropriate be implemented in hardware, software, or a combination of the two.

Reference herein to "one embodiment" or "an embodiment" means that a particular feature, structure, or characteristic described in connection with the embodiment can be included in at least one implementation of the invention. Any appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method of generating factors of a RSA modulus N with a predetermined portion $N_h$ and a non-predetermined portion $N_l$, the RSA modulus N comprising at least two factors, the method being performed by a device and comprising steps of:
   generating a first prime p;
   obtaining a value $N_h$ that forms a part of the RSA modulus N;
   generating a second prime q; and
   outputting at least a lossless compressed representation of the RSA modulus N that enables unambiguous recovery of the RSA modulus N;
   wherein the second prime q is randomly generated in a predetermined interval dependent from p and $N_h$ so that pq is a RSA modulus that shares $N_h$;
   wherein the predetermined portion $N_h$ heads the RSA modulus N;
   wherein the RSA modulus N is a n-bit modulus and the predetermined portion $N_h$ comprises k bits;
   wherein the first prime p is generated in an interval $p \in [2^{n-n_0-1/2}, 2^{n-n_0}-1]$ so that gcd(p−1,e)=1, wherein e is a public exponent and wherein $1 < n_0 < n$;
   wherein the second prime q is generated in an interval $q \in$ $$\left[\frac{2^{n-k}N_h + 1}{p}, \frac{2^{n-k}(N_h + 1) - 1}{p}\right],$$

so that gcd(q−1,e)=1; and
   wherein $N = N_h \| N_l$, where $N_l = (pq) \bmod 2^{n-k}$.

2. A method of generating factors of a RSA modulus N with a predetermined portion $N_h$ and a non-predetermined portion $N_l$, the RSA modulus N comprising at least two factors, the method being performed by a device and comprising steps of:
   obtaining, from a random seed $s_0$, a value $N_h$ that forms a part of the RSA modulus N;
   wherein the RSA modulus N is a n-bit modulus and the predetermined portion $N_h$ comprises k bits;
   generating a first prime p in an interval $p \in [2^{n-n_0-1/2}, 2^{n-n_0}-1]$ so that gcd(p−1,e)=1, wherein e is a public exponent and wherein $1 < n_0 < n$;
   generating a second prime q by calculating $q = C + q'2^k$, where $C = N_k/p \bmod 2^k$
   and q' is generated in the interval $$\left[\frac{2^{n-1} + 1 - Cp}{2^k p}, \frac{2^{n-1} - Cp}{2^k p}\right]$$

so that gcd(q−1,e)=1;
   defining the non-predetermined portion $N_l$ as $$\left[\frac{pq}{2^k}\right];$$

and
   outputting at least a lossless compressed representation Ñ of the RSA modulus N that enables unambiguous recovery of the RSA modulus N, wherein Ñ={$N_l, s_0[k,n]$};
   wherein the second prime q is randomly generated in a predetermined interval dependent from p and $N_h$ so that pq is a RSA modulus that shares $N_h$; and
   wherein the predetermined portion $N_h$ trails the RSA modulus N.

3. The method of claim 1, wherein $N_h$, is obtained by encryption of at least a part of the first prime p.

4. A device for generating factors of a RSA modulus N with a predetermined portion $N_h$ and a non-predetermined portion $N_l$, the RSA modulus N comprising at least two factors, the device comprising:
   a hardware processor configured to:
   generate a first prime p;
   obtain a value $N_h$ that forms a part of the RSA modulus N; and
   randomly generate a second prime q in a predetermined interval dependent from p and $N_h$ so that pq is a RSA modulus that shares $N_h$; and
   an interface configured to output at least a lossless compressed representation of the RSA modulus N that enables unambiguous recovery of the RSA modulus N;
   wherein the predetermined portion $N_h$ heads the RSA modulus N;

wherein the RSA modulus N is a n-bit modulus and the predetermined portion $N_h$ comprises k bits;

wherein the first prime p is generated in an interval $p \in [2^{n-n_0-1/2}, 2^{n-n_0}-1]$ so that $\gcd(p-1,e)=1$, wherein e is a public exponent and wherein $1 < n_0 < n$;

wherein the second prime q is generated in an interval $q \in$ $$\left[\frac{2^{n-k}N_h+1}{p}, \frac{2^{n-k}(N_h+1)-1}{p}\right],$$

so that $\gcd(q-1,e)=1$; and wherein $N=N_h \| N_l$, where $N_l=(pq) \bmod 2^{n-k}$.

5. The device of claim 4, wherein the device is a smartcard.

6. A device for generating factors of a RSA modulus N with a predetermined portion $N_h$ and a non-predetermined portion $N_l$, the RSA modulus N comprising at least two factors, the device comprising:

a hardware processor configured to:

obtain from a random seed $s_0$, a value $N_h$ that forms a part of the RSA modulus N;

wherein the RSA modulus N is a n-bit modulus and the predetermined portion $N_h$ comprises k bits;

generate a first prime p in an interval $p \in [2^{n-n_0-1/2}, 2^{n-n_0}-1]$ so that $\gcd(p-1,e)=1$, wherein e is a public exponent and wherein $1 < n_0 < n$;

generate a second prime q by calculating $q=C+q'2^k$, where $C=N_k/p \bmod 2^k$ and q' is generated in the interval $$\left[\frac{2^{n-1}+1-Cp}{2^k p}, \frac{2^{n-1}-Cp}{2^k p}\right]$$

so that $\gcd(q-1,e)=1$;

define the non-predetermined portion $N_l$ as $N_l=$ $$\left[\frac{pq}{2^k}\right];$$

and an interface configured to output at least a lossless compressed representation $\tilde{N}$ of the RSA modulus N that enables unambiguous recovery of the RSA modulus N, wherein $\tilde{N}=\{N_l, s_0[k,n]\}$;

wherein the second prime q is randomly generated in a predetermined interval dependent from p and $N_h$ so that pq is a RSA modulus that shares $N_h$; and wherein the predetermined portion $N_h$ trails the RSA modulus N.

7. The method of claim 2, wherein $N_h$, is obtained by encryption of at least a part of the first prime p.

* * * * *